(12) United States Patent
Take

(10) Patent No.: US 7,123,602 B2
(45) Date of Patent: Oct. 17, 2006

(54) METHOD AND APPARATUS FOR ASSIGNING CODES

(75) Inventor: Keijiro Take, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/796,017

(22) Filed: Mar. 10, 2004

(65) Prior Publication Data

US 2004/0170144 A1 Sep. 2, 2004

Related U.S. Application Data

(60) Division of application No. 10/013,451, filed on Dec. 13, 2001, which is a continuation of application No. 09/156,703, filed on Sep. 18, 1998, now Pat. No. 6,477,158.

(30) Foreign Application Priority Data

Mar. 16, 1998 (JP) .................................. 10-065434

(51) Int. Cl.
*H04B 7/216* (2006.01)
*H04J 3/06* (2006.01)

(52) U.S. Cl. ..................... 370/335; 370/342; 370/350

(58) Field of Classification Search ............... 370/320, 370/335, 342, 441, 479, 203, 350, 332, 508–510; 375/200
See application file for complete search history.

(56) References Cited

U.S. PATENT DOCUMENTS

| | | | |
|---|---|---|---|
| 5,309,474 A | 5/1994 | Gilhousen et al. | |
| 5,345,467 A | 9/1994 | Lomp et al. | |
| 5,586,113 A * | 12/1996 | Adachi et al. | 370/342 |
| 5,673,260 A | 9/1997 | Umeda et al. | |
| 5,740,168 A * | 4/1998 | Nakamura et al. | 370/347 |
| 5,751,761 A | 5/1998 | Gilhousen | |
| 5,862,132 A * | 1/1999 | Blanchard et al. | 370/342 |
| 6,041,034 A | 3/2000 | Fukumasa et al. | |
| 6,061,337 A * | 5/2000 | Light et al. | 370/331 |
| 6,078,572 A * | 6/2000 | Tanno et al. | 370/335 |
| 6,084,884 A * | 7/2000 | Adachi | 370/441 |

(Continued)

FOREIGN PATENT DOCUMENTS

EP 0 765 096 3/1997

(Continued)

OTHER PUBLICATIONS

Adachi et al., Wideband Multi-rate DS-CDMA for Next Generation Mobile Communications Systems, Aug. 1997, Wireless Communications Conference, 0-7803-4194-5/97 IEEE, pp. 57-62.*

(Continued)

*Primary Examiner*—Chi Pham
*Assistant Examiner*—Tri H. Phan
(74) *Attorney, Agent, or Firm*—Oblon, Spivak, McClelland, Maier & Neustadt, P.C.

(57) ABSTRACT

A base station controller selects codes corresponding to rate information included in a new starting call message from a mobile station, and further selects codes assignable to the mobile station out of the selected codes as candidate codes. Then, the base station controller detects codes which meet both the characteristics of being at upper level of the candidate codes in the tree structure and being assignable to other mobile station, and further detects levels of the detected codes. Detected levels for all the candidate codes are compared to find a candidate code whose level is the lowest and to assign the candidate code to the mobile station sending the new starting call message.

4 Claims, 17 Drawing Sheets

U.S. PATENT DOCUMENTS

| | | | |
|---|---|---|---|
| 6,085,349 | A | 7/2000 | Stein |
| 6,144,650 | A | 11/2000 | Watanabe et al. |
| 6,148,209 | A | 11/2000 | Hamalainen et al. |
| 6,226,315 | B1 | 5/2001 | Sriram et al. |
| 6,233,231 | B1 | 5/2001 | Felix et al. |
| 6,400,755 | B1* | 6/2002 | Harris et al. ............... 375/146 |
| 6,477,158 | B1 | 11/2002 | Take |
| 6,532,364 | B1* | 3/2003 | Uchida et al. ............ 455/436 |
| 6,597,673 | B1 | 7/2003 | Nobuyasu et al. |
| 6,614,810 | B1* | 9/2003 | Lee et al. ................. 370/471 |

FOREIGN PATENT DOCUMENTS

| | | |
|---|---|---|
| EP | 0 814 581 | 12/1997 |
| JP | 6-6290 | 1/1994 |
| JP | 7-222237 | 8/1995 |
| JP | 09-261162 * | 10/1997 |

OTHER PUBLICATIONS

Adachi et al., Wideband Multi-rate DS-CDMA MobileRadio Access, Dec. 1997, Asia Pacific Microwave Conference, APMC '97, vol. 1, 2-5, pp. 149-152.*

Okawa et al., Orthogonal Multi-Spreading Factor Forward Link for Coherent DS-CDMA Mobile Radio, Oct. 1997, Universal Personal Communication Record, '97 Conference, 0-7803-3777-8/97 IEEE, vol. 2, pp. 618-622.*

Adachi, F. et al., "Multi-rate Wideband DS-CDMA Radio Access for Next Generation Mobile Radio Sytem", IEICE, pp. 33-38, (Sep. 1997).

F. Adachi, et al., Electronics Letters, vol. 33, No. 1, pp. 27-28, "Tree-Structured Generation of Orthogonal Spreading Codes with Different Lengths for Forward Link of DS-CDMA Mobile Radio", Jan. 2, 1997.

* cited by examiner

Fig.13

16 : LEVEL LIST

| CANDIDATE CODE | UPPER NOT-ASSIGNABLE CODE | LEVEL |
|---|---|---|
| $C_3(1)$ | $C_2(1)$ | LEVEL2 |
| $C_3(3)$ | $C_1(1)$ | LEVEL1 |
| $C_3(4)$ | $C_1(1)$ | LEVEL1 |

Fig.15

26 : SWITCHING LIST

| CANDIDATE CODE | ASSIGNED CODE | SWITCHABLE CODE |
|---|---|---|
| $C_3(2)$ | $C_4(3)$ | $C_4(2)$ |
| $C_3(1)$ | $C_4(1)$ | $C_4(4)$ |

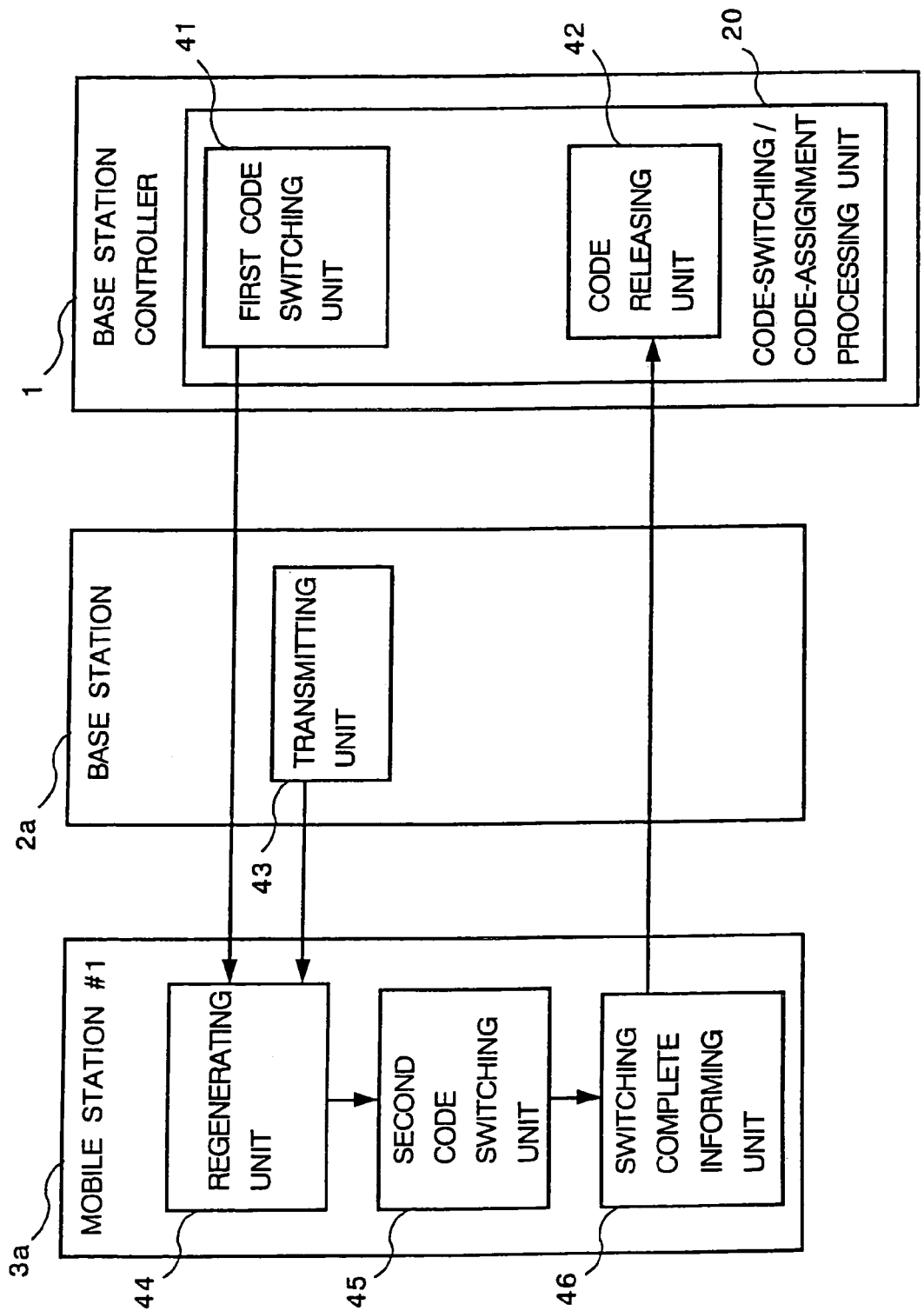

METHOD AND APPARATUS FOR ASSIGNING CODES

BACKGROUND OF THE INVENTION

1. Field of the Invention

The present invention relates to code assignment in multi-rate communications of the radio communication system employing Code Division Multiple Access (CDMA) system, where codes having tree structured orthogonal multi-spreading factor sequence are used as spreading codes.

2. Description of the Related Art

The system utilizing coherent multi code and the system utilizing tree structured multi-spreading factor sequence code have been introduced as a multi-rate transmission system in the radio communication system employing DS-CDMA (Direct Sequence-CDMA). In the multi-rate transmission utilizing the coherent multi code, plural codes are simultaneously used to perform multi-code-multiplexing. In the multi-rate transmission utilizing the tree structured multi-spreading factor sequence code, orthogonal codes having equivalent spreading factors are multiplexed in parallel. Receivers for receiving plural codes are needed for a mobile station used for the multi-rate transmission utilizing the coherent multi code. On the other hand, only one receiver is needed for the system utilizing the tree structured multi-spreading factor sequence code.

The conventional CDMA system using tree structured orthogonal multi-spreading factor sequences is disclosed in, for example, a technical report entitled "Multi-rate Wideband DS-CDMA Radio Access For Next Generation Mobile Radio Systems", the Institute of Electronics, Information and Communication Engineers, RCS-97-86, 1997. The conventional system will be explained with reference to FIG. 11.

FIG. 11 shows a configuration of the conventional tree structured orthogonal multi-spreading factor sequences.

The tree structure is composed of four levels: level 1 at the top through level 4 at the bottom, defined just for convenience. As there are four levels in this case, the channel transmission rate using the top level (level 1) code is eight times as fast as that of the channel using the lowest level (level 4) code. The channel transmission rate using level 2 code is four times the rate of channel using the level 4 code. The channel transmission rate using level 3 code is twice the rate of channel using the level 4 code. Cx(y) in FIG. 11 represents a kind of codes, x stands for a code level, y stands for an identification number in the same code level, and .smallcircle. stands for a code.

In FIG. 11, a code in the level 1 can be used for communication of twice the transmission rate of level 2. Now, a concrete example will be explained referring to the case of tree structure as shown in FIG. 11. When C.sub.2(1) is assigned to a user of four times the transmission rate of the lowest rate (C.sub.4(x) level in FIG. 11), the codes C.sub.4 (1), C.sub.4(2), C.sub.4(3), C.sub.4(4), C.sub.3(1), and C.sub.3(2) can not be assigned to other users because of keeping the code orthogonality. Due to this characteristic, all the lower level codes connected with an assigned code through branches and all the upper level codes connected with the assigned code through only upward branches are not-assignable. When C.sub.2(1) is the assigned code, all the lower codes C.sub.4(1), C.sub.4(2), C.sub.4(3), C.sub.4(4), C.sub.3(1) and C.sub.3(2) connected with the assigned code by branches are not-assignable, and the upper code C.sub.1 (1) connected with the assigned code by the shortest branch is not-assignable, either.

As stated above, in CDMA system using codes of tree structured orthogonal multi-spreading factor sequences, the code assignment for a mobile station is restricted because of the characteristic. Accordingly, in the case of FIG. 11, if C.sub.4(5) and C.sub.4(7) are assigned to calls of the lowest rate (level 4), it is impossible to assign a call having the rate of level 3 or upper than level 3. However, on the supposition that C.sub.4(6) is assigned to the call of level 4 instead of C.sub.4(7), it is possible to assign C.sub.3(4) to the call of level 3, consequently channels are effectively utilized.

OBJECTS OF THE PRESENT INVENTION

In the multi-rate transmission of the conventional radio communication system employing Code Division Multiple Access (CDMA) system where codes having tree structured orthogonal multi-spreading factor sequence are used, when a code has been already assigned (in use), it is impossible to assign all the codes upper than the code. This causes a problem that the channel utilization is deteriorated. It is an object of the present invention to utilize all the system (all the branches) of the tree structure for assigning a code to be responsive to a new call, in order to enhance the channel utilization.

In the conventional art, a channel mismatch would occur at the call ending, even if a channel match was kept at the code assigning time of a new call starting. This sometimes causes a problem that selecting a code to be assigned to a new call is impossible. It is another object of the present invention is to avoid the channel mismatch by switching a code being used in communication. Consequently, call loss rate can be reduced.

In the code assignment of the conventional radio communication system employing CDMA system, it is necessary for a base station and a mobile station to simultaneously switch codes in order not to stop the communication under way. However, as the base station does not have means for judging a code switch timing over the mobile station, the base station is troublesomely needed to simultaneously perform reception and transmission using both the codes used before and after switching. It is another object of the present invention to reduce the stop time caused by code switching and the hardware needed for reception/transmission using both the codes between the base station and the mobile station, by means of sending the code switching timing from the base station.

In the code assignment of the conventional radio communication system employing CDMA system, there is a problem that much process is needed for synchronizing the code switch timings in the base station and the mobile station. It is another object of the present invention to reduce the code switching process by means of depending on mobile station's own timing.

Namely, it is a general object of the present invention to provide an apparatus and a method for effectively utilizing the channel, comprising means in the base station to judge a code switch timing over the mobile station, and reducing the synchronization process.

SUMMARY OF THE INVENTION

According to one aspect of the present invention, a code assigning apparatus used in a radio communication system including a base station controlling apparatus, a plurality of base stations, and a plurality of mobile stations, employing CDMA (Code Division Multiple Access) method, which uses codes of tree structured orthogonal multi-spreading factor sequences as spreading codes, for radio access between the plurality of base stations and the plurality of mobile stations, and providing multi-rate transmission between the plurality of mobile stations and the plurality of base stations, the code assigning apparatus comprises a code selecting unit for selecting an assignable code which suits specifications requested by a new starting call and exists in a location as close to a not-assignable code as possible and in a level lower than the not-assignable code in the tree structure.

According to another aspect of the present invention, the code selecting unit of the code assigning apparatus comprises a first selecting unit for selecting one or more than one codes corresponding to rate information included in a message from one of the plurality of mobile stations, as first codes, a second selecting unit for selecting one or more than one first codes if they are assignable to the one of the plurality of mobile stations, as second codes, a level detecting unit for retrieving codes upper than the second codes one by one, detecting not-assignable codes, which are assigned to another of the plurality of mobile stations, out of the codes upper than the second codes, as third codes, and detecting each level of the third codes, a third selecting unit for selecting one of the second codes whose upper third code is in a lowest level in the tree structure, and a code assigning unit for assigning the one of the second codes selected by the third selecting unit to the one of the plurality of mobile stations.

According to another aspect of the present invention, the code assigning apparatus comprises a code-switching/code-assignment processing unit, when there is no assignable code which suits specifications requested by a new starting call, for making a code which is not-assignable and suits the specifications requested by the new starting call assignable by way of switching an assigned code being used to another code connected by a branch different from a branch used for the assigned code in the tree structure.

According to another aspect of the present invention, the code-switching/code-assignment processing unit of the code assigning apparatus comprises a first selecting unit for selecting one or more than one codes corresponding to rate information included in a message from the second mobile station, as first codes, a second selecting unit for selecting one or more than one first codes if they are assignable to the second mobile station, as second codes, a fourth selecting unit, when there is no second code, for selecting one or more than one first codes if their lower codes have been assigned to the first mobile station, as fifth codes, an assigned code detecting unit for detecting a code lower than the fifth codes and assigned to the first mobile station as a fourth code, a switchable code detecting unit for detecting a code to which switchable from the fourth code, for the first mobile station, as a sixth code, a code switch directing unit for directing the first mobile station to switch from the fourth code to the sixth code, and an assigning unit for assigning a fifth code to the second mobile station after switching all the fourth codes to other codes.

According to another aspect of the present invention, the code-switching/code-assignment processing unit includes a code switch informing unit for informing that the fourth code having been used by the first mobile station can be switched to a sixth code, one of the plurality of base stations includes a timing information sending unit for sending timing information of switching from the fourth code to the sixth code to the first mobile station, the first mobile station includes a code switching unit for switching the fourth code to the sixth code based on the informing of the code-switching/code-assignment processing unit and the timing information of the one of the base stations, the one of the plurality of base stations includes a switching unit for switching downlink transmission codes at time when the timing information is sent to the first mobile station, and the code-switching/code-assignment processing unit includes a code releasing unit for releasing the fourth code used by the first mobile station, at the time when the timing information is sent to the first mobile station.

According to another aspect of the present invention, the code-switching/code-assignment processing unit includes a first code switching unit for informing the first mobile station that a fourth code being used by the first mobile station is to be switched to a sixth code, one of the plurality of base stations includes a transmitting unit for performing transmission using both the fourth code and the sixth code to the first mobile station, the first mobile station includes a regenerating unit for receiving both the fourth code and the sixth code and generating reception information by performing maximum ratio combination, a second code switching unit for switching a state of synthesizing maximum ratio to a state of receiving only the sixth code based on own timing, and a switching complete informing unit for informing that code switching has been completed in the first mobile station, and the code-switching/code-assignment processing unit includes a code releasing unit for releasing the fourth code used by the first mobile station, based on the informing from the first mobile station.

According to another aspect of the code assigning apparatus of the present invention, the code selecting unit is provided in either one of the plurality of base stations or the base station controlling unit.

According to another aspect of the code assigning apparatus of the present invention, the code-switching/code-assignment processing unit is provided in either one of the plurality of base stations or the base station controlling unit.

According to one aspect of a method of assigning codes of the present invention, used in a radio communication system including a base station controlling apparatus, a plurality of base stations, and a plurality of mobile stations, employing CDMA (Code Division Multiple Access) which uses codes of tree structured orthogonal multi-spreading factor sequences as spreading codes, for radio access between the plurality of base stations and the plurality of mobile stations, and providing multi-rate transmission between the plurality of mobile stations and the plurality of base stations, the method of assigning codes comprises the steps of selecting one or more than one codes corresponding to rate information included in a message from one of the plurality of mobile stations, as first codes, selecting one or more than one first codes if they are assignable to the one of the plurality of mobile stations, as second codes, retrieving codes upper than the second codes one by one, detecting not-assignable codes, which are assigned to another of the plurality of mobile stations, out of the codes upper than the second codes, as third codes, detecting each level of the third codes, selecting one of the second codes whose upper third code is in a lowest level in the tree structure, and assigning the one of the second codes selected by the above step to one of the plurality of mobile stations.

According to another aspect of the method of assigning codes of the present invention comprises the steps of selecting one or more than one codes corresponding to rate information included in a message from the second mobile station as first codes, selecting one or more than one first codes if they are assignable to the second mobile station as second codes, when there is no second code, selecting one or more than one first codes if their lower codes have been assigned to the first mobile station, as fifth codes, detecting a code lower than the fifth codes and assigned to the first mobile station, as a fourth code, detecting a code to which switchable from the fourth code for the first mobile station, as a sixth code, directing the first mobile station to switch from the fourth code to the sixth code, and assigning a fifth code to the second mobile station after switching all the fourth codes to other codes.

According to another aspect of the method of assigning codes of the present invention comprises the steps of informing that a fourth code having been used by the first mobile station can be switched to a sixth code, sending timing information of switching from the fourth code to the sixth code to the first mobile station, switching the fourth code to the sixth code based on the informing of the informing step and the timing information of the sending timing information step, switching downlink transmission codes based on the timing information sent to the first mobile station, and releasing the fourth code used by the first mobile station, based on the timing information.

According to another aspect of the method of assigning codes of the present invention comprises the steps of informing the first mobile station that a fourth code being used by the first mobile station is to be switched to a sixth code, performing downlink transmission using both the fourth code and the sixth code to the first mobile station, receiving both the fourth code and the sixth code, generating reception information by performing maximum ratio combination, switching a state of synthesizing maximum ratio to a state of receiving only the sixth code based on own timing, informing that code switching has been completed in the first mobile station, and releasing the fourth code used by the first mobile station, based on the informing from the first mobile station.

The above and other objects and features of the invention will appear more fully hereinafter from a consideration of the following description taken in connection with the accompanying drawing wherein one example is illustrated by way of example.

BRIEF DESCRIPTION OF THE DRAWINGS

In the drawings:

FIG. 13 shows a level list according to the present invention;

FIG. 15 shows a switching list according to the present invention;

FIG. 17 shows a system structure according to the present invention.

DETAILED DESCRIPTION OF THE PREFERRED EMBODIMENTS

Embodiment 1.

Figure 1:
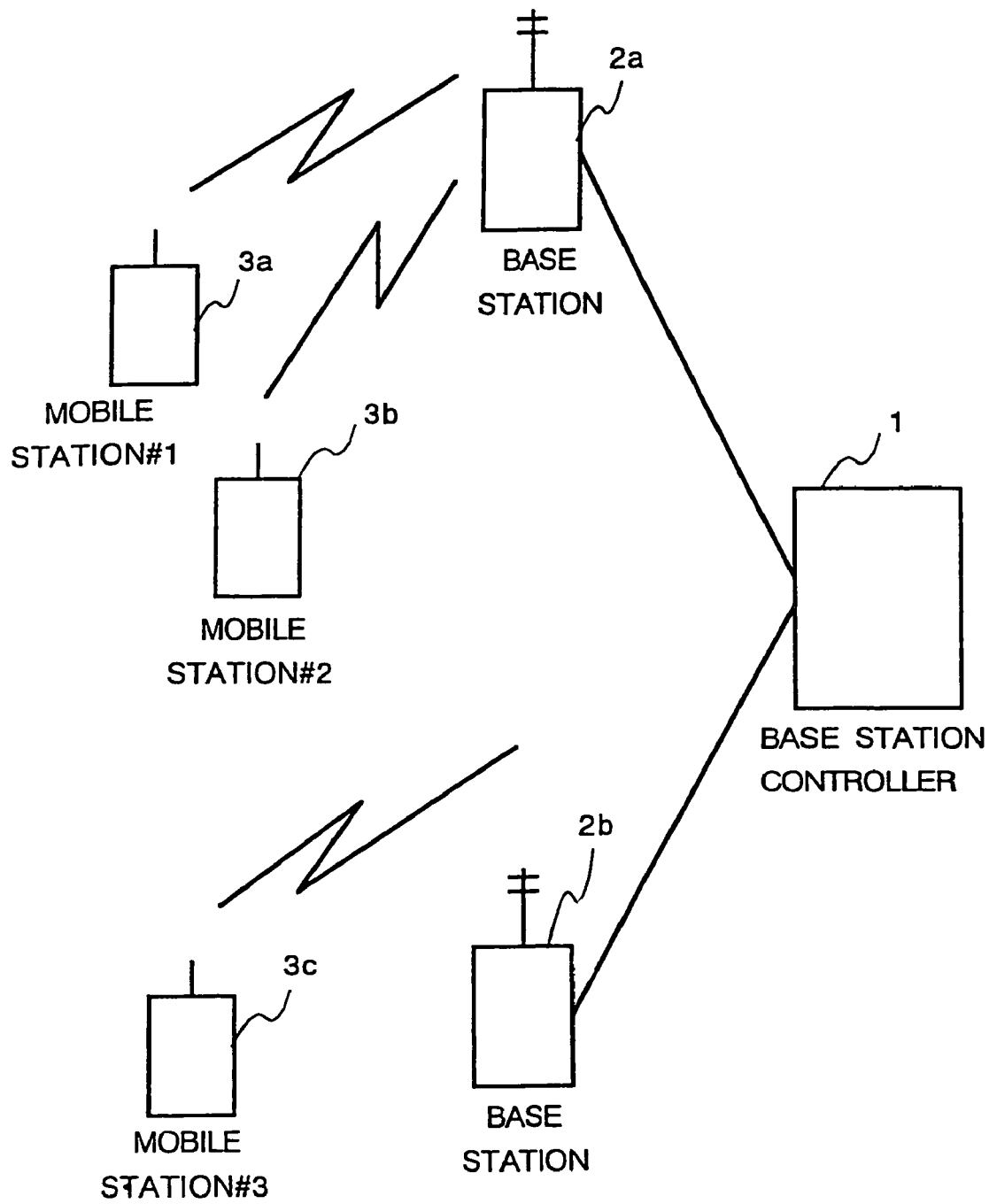
FIG. 1 shows a configuration of radio communication system applying a code assignment method according to the present invention.
Figure 2:
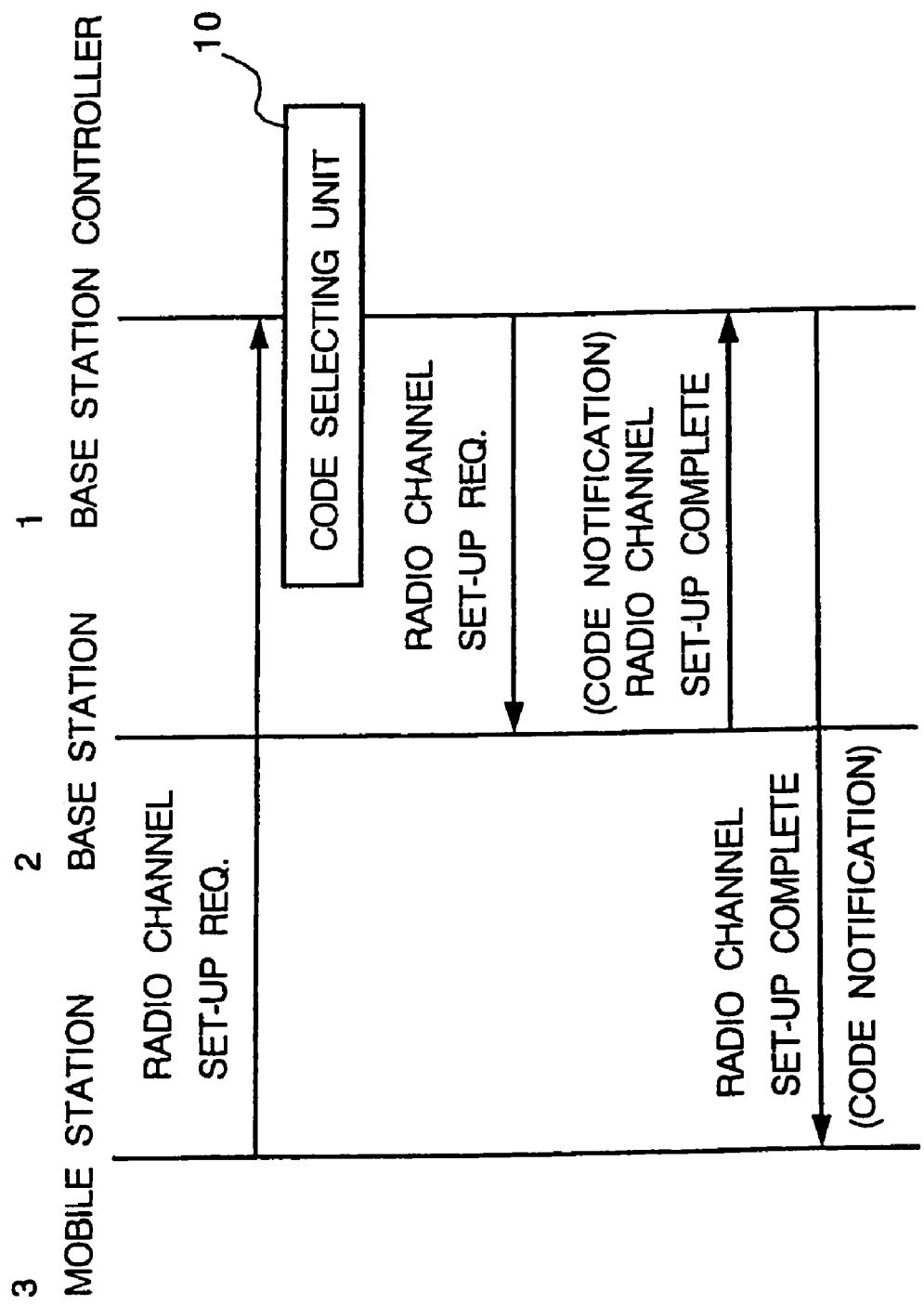
FIG. 2 illustrates sequence of a code assignment procedure according to the present invention.
Figure 3:
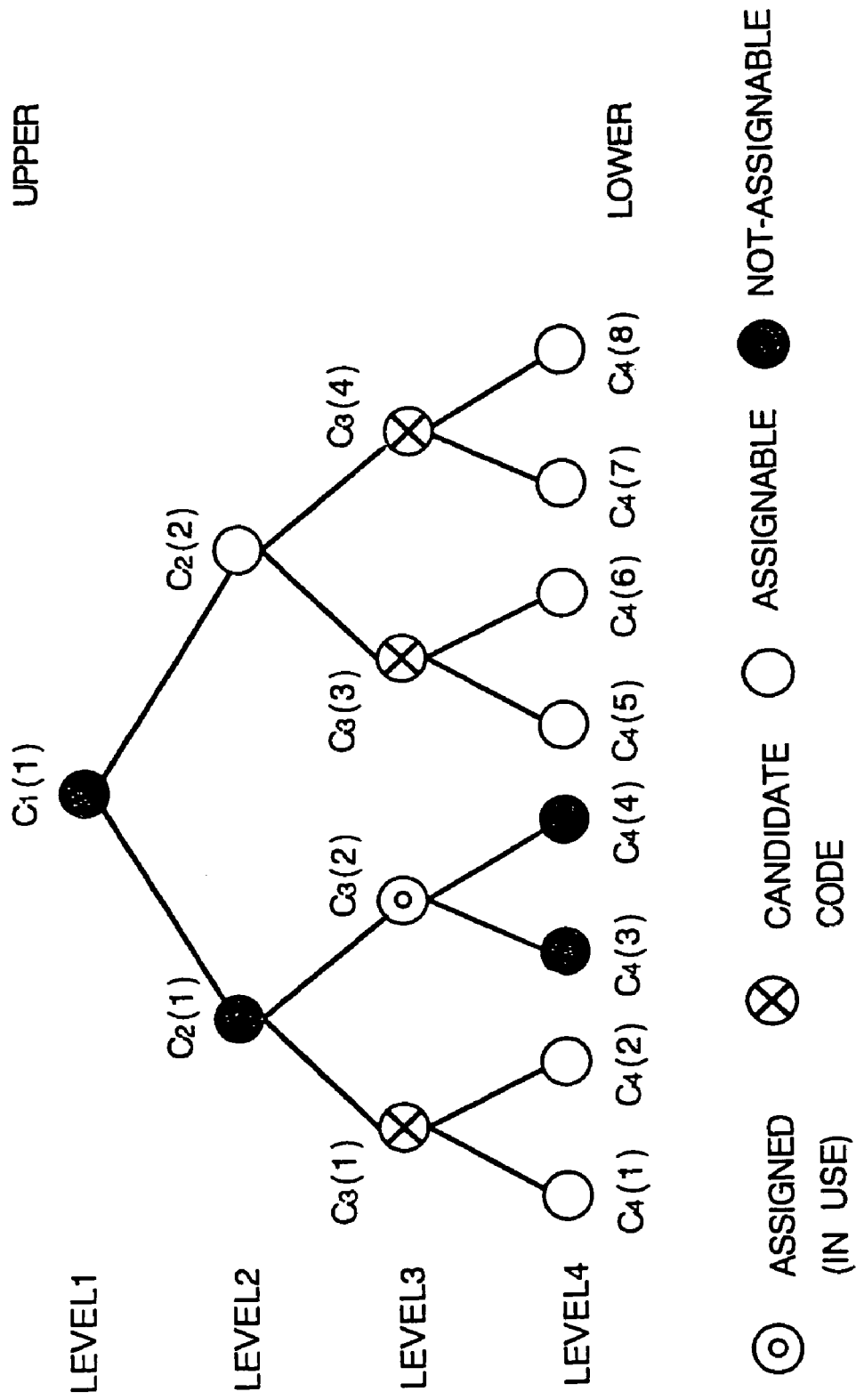
FIG. 3 shows a code structure used for the code assignment procedure of FIG. 2.
Figure 4:
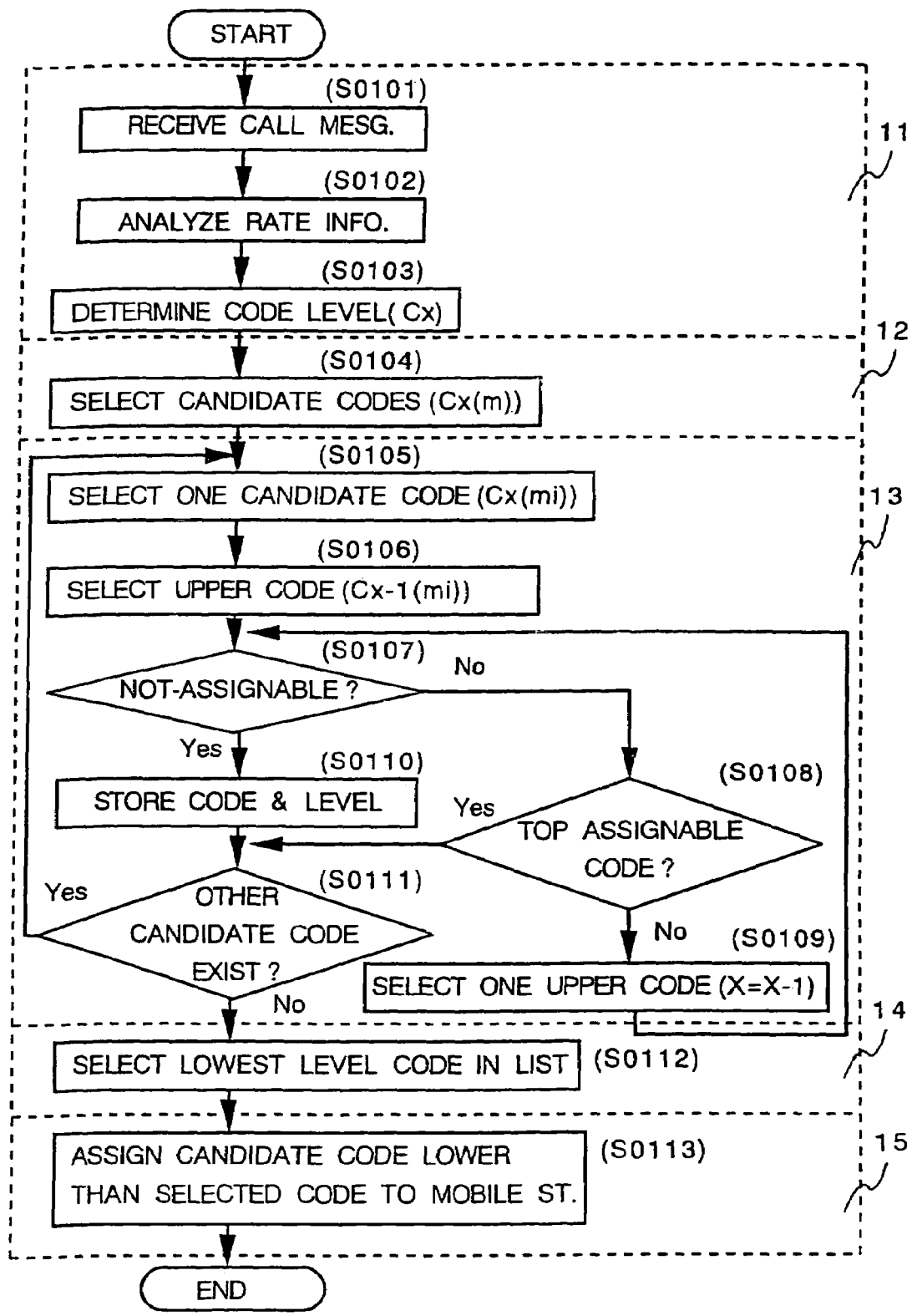
FIG. 4 is a flowchart showing a process of the code assignment procedure of FIG. 2.
Figure 12:
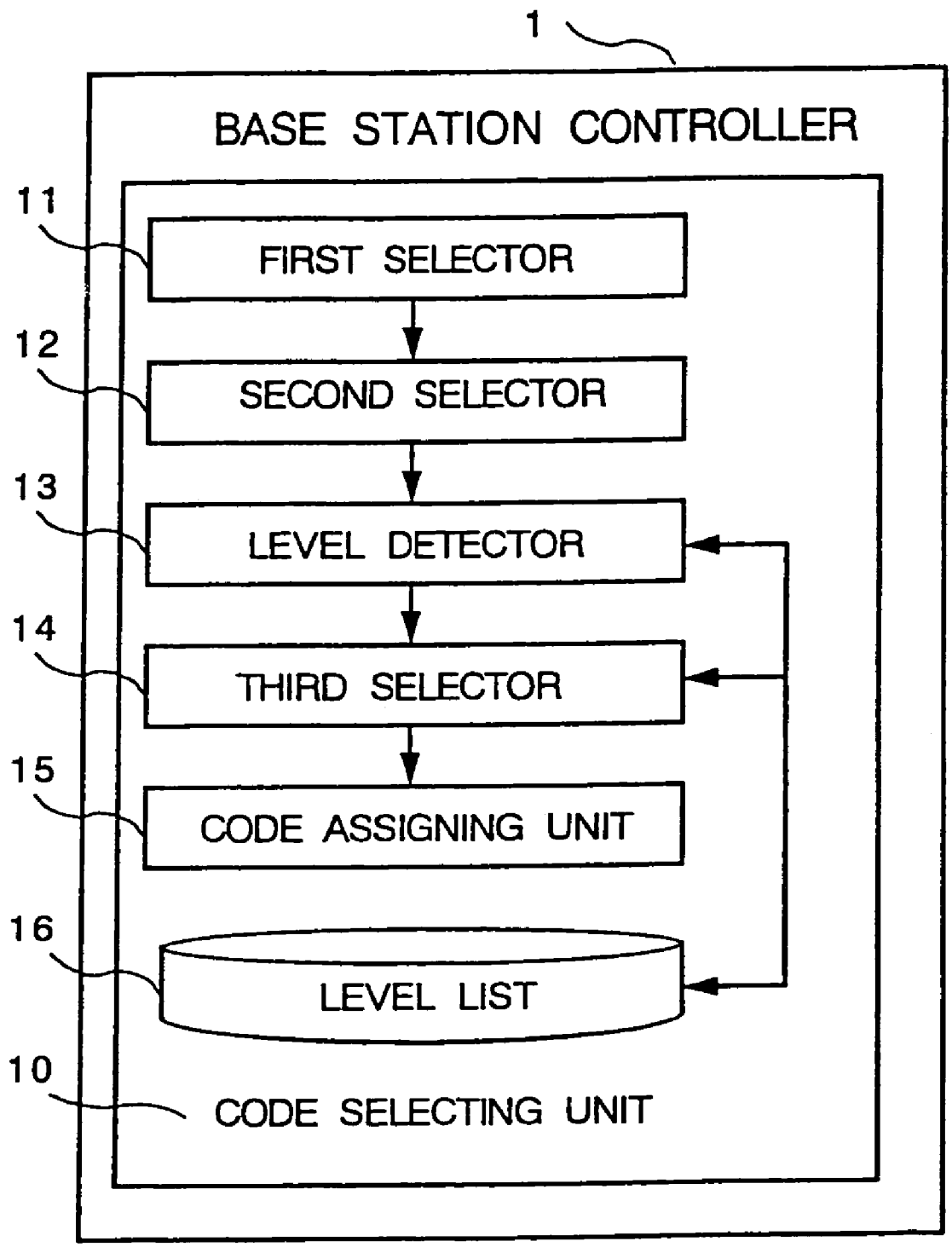
FIG. 12 shows a configuration of a code selecting unit in a base station controller according to the present invention.

FIG. 1 shows a configuration of radio communication system applying a code assignment method according to the present embodiment. FIG. 2 illustrates sequence of a code assignment procedure according to the present embodiment. FIG. 3 shows a code structure example of the code assignment procedure of FIG. 2. FIG. 4 is a flowchart showing a process of the code assignment procedure of FIG. 2. FIG. 12 shows a configuration of a base station controller 1. Referring to FIGS. 1, 2, 3, 4, and 12, one embodiment of code assignment performed in a base station 2 and the base station controller 1 according to the present invention will be described.

FIG. 1, showing a configuration of radio communication system of the present embodiment and other embodiments, is composed of plural mobile stations 3a, 3b and 3c, plural base stations 2a, and 2b, and the base station controller 1 which controls the plural base stations 2a and 2b. The mobile stations 3a, 3b and 3c are just called as a "mobile station 3" in the case of describing each mobile station being unnecessary. The base stations 2a and 2b are also called as a "base station 2" in the case of describing each base station being unnecessary. The mobile station 3 is connected to the base station 2 via a radio channel. The radio channel utilizes the Code Division Multiple Access (CDMA) system as a radio access system, and uses spreading codes having tree structured orthogonal multi-spreading factor sequences. According to the radio communication system of the present embodiment, it is possible to set up multiple rates. Namely, the base station 2 and the mobile station 3 can set up channels of plural-kinds rates for each call, using the radio channel. As orthogonal multi spreading codes are used, a channel having a double transmission rate can be set up in proportion as a code level goes up one by one.

FIG. 2 illustrates sequence of a code assignment procedure in responsive to a call from the mobile station 3. Referring to FIGS. 1 and 2, the code assignment procedure regarding the base station controller 1, the base station 2 and the mobile station 3 will now be explained. First, a radio channel set-up request message is transmitted from the mobile station 3 to the base station controller 1 via the base station 2. The base station controller 1 analyzes the message in order to detect a transmission rate requested by the mobile station 3. The base station controller 1 determines a pair of codes for transmission to be used by the mobile station 3 and the base station 2, based on the code assignment process stated later. Then, the base station controller 1 transmits the radio channel set-up request message to the base station 2.

The radio channel set-up request message includes information of the code pair. Receiving the message, the base station 2 begins to prepare for reception/transmission based on an appointed code, and transmits a radio channel set-up complete message to the base station controller 1. On receiving the radio channel set-up complete message, the base station controller 1 transmits the radio channel set-up complete message appointing the pair of codes to the mobile station 3. After receiving the message, the mobile station 3 starts communication with the base station 2, based on the appointed code.

As stated above, the communication channel between the mobile station 3 and the base station 2 is set up based on the request from the mobile station 3. A code selection process, performed in the base station controller 1 for the mobile station 3 and the base station 2 is explained with reference to FIGS. 3, 4 and 12. FIG. 3 shows a tree structure of codes having orthogonal multi-spreading factor sequence. In FIG. 3, the tree structure is composed of four levels; level 1 at the top through level 4 at the bottom, defined just for convenience. As there are four levels in this case, the channel transmission rate using the top level (level 1) code is eight times as fast as that of channel using the lowest level (level 4) code. The channel transmission rate using level 2 code is four times the rate of channel using level 4 code. The channel transmission rate using level 3 code is twice the rate of channel using level 4 code.

Cx(y) in FIG. 3 represents a kind of codes; x stands for a code level, y stands for an identification number in the same code level, and .smallcircle. stands for a code. In the tree structured orthogonal multi spreading sequence codes, codes lower than a specific code being used (that is, larger number level codes connected with the specific code by branches in FIG. 3) can not be used because of keeping the orthogonality characteristic.

In addition, codes upper than the specific code being used (that is, smaller number level codes connected with the specific code through only upward branches) also can not be utilized. When $C.sub.3(2)$ is being used in FIG. 3, $C.sub.1(1)$, $C.sub.2(1)$, $C.sub.4(3)$ and $C.sub.4(4)$ can not be used. Therefore, it is necessary to appropriately assign a code to a new call from the mobile station 3.

FIG. 12 shows a configuration of a code selecting unit 10 in the base station controller 1. FIG. 4 is a flowchart showing code assignment processes, for the mobile station 3 and the base station 2, performed in the code selecting unit 10. When a first selector 11 of the base station controller 1 receives the radio channel set-up request message from the mobile station 3 (S0101), the first selector 11 analyses rate information in the message (S0102), and determines a code level needed for the mobile station 3 and the base station 2 (S0103). In FIG. 3, for instance, the code level requested by the mobile station 3 is level 3. Secondly, a second selector 12 of the base station controller 1 selects candidate codes which can be used in the determined level (S0104). In FIG. 3, $C.sub.3(1)$, $C.sub.3(3)$ and $C.sub.3(4)$ are selected as the candidate codes.

A level detector 13 of the base controller 1 selects a code out of the candidate codes (S0105), selects another code in a level one more upper than the selected code (S0106), and judges whether or not the one more upper level code can be assigned (S0107). In FIG. 3, if the candidate code is $C.sub.3(1)$, the one more upper level code is $C.sub.2(1)$. Then, when the one more upper level code is able to be assigned, the judging procedure is repeated upwards along the branches until it comes to a code which can not be assigned (S1018, S0109). If a code that is not assignable is detected, the code and its level are memorized in a level list 16 for each of the candidate codes (S0107, S0110). When $C.sub.3(1)$ in FIG. 3 is the candidate code, one more upper code $C.sub.2(1)$ is not assignable. Then, $C.sub.3(1)$, $C.sub.2(1)$ and the level 2 are stored in the level list 16 as shown in FIG. 13. This procedure is performed for each candidate code to complete the level list 16 shown in FIG. 13 (S0111).

A third selector 14 selects a candidate code whose upper not-assignable code has the lowest level, in the level list 16 (S0112). Then, the candidate code is selected to be assigned to the mobile station 3 (S0113). If there are several candidate codes whose upper not-assignable codes have the same code level, any of the candidate codes can be selected. If a candidate code has no upper not-assignable code, the top level code is regarded as the upper not-assignable code. As shown in FIG. 13, $C.sub.2(1)$ being the upper not-assignable code and level 2 are selected for the candidate code $C.sub.3(1)$ in FIG. 3. $C.sub.1(1)$ and level 1 are for the candidate code $C.sub.3(3)$, and $C.sub.1(1)$ and level 1 are for the candidate code $C.sub.3(4)$. Therefore, $C.sub.3(1)$, whose upper not-assignable code is $C.sub.2(1)$, is selected as a code to be assigned. According to this assigning method, $C.sub.3(3)$ and $C.sub.3(4)$ in FIG. 3 are not selected. The code $C.sub.3(1)$ is assigned to the mobile station 3 by a code assigning unit 15. If a new call corresponding to level 2 is requested after the call corresponding to level 3 has been in use as shown in FIG. 3, $C.sub.2(2)$ can be assigned to the new call.

According to the present assigning method, a channel mismatch at the code assigning time of a new call starting, caused by the tree structure characteristic, is avoided. Therefore, a code assignment for multi-rate transmission can be performed without deteriorating the channel utilization efficiency. It is also acceptable to provide the code selecting unit 10 of FIG. 12 in the base station 2 instead of the base station controller 1.

Embodiment 2.

Figure 5:
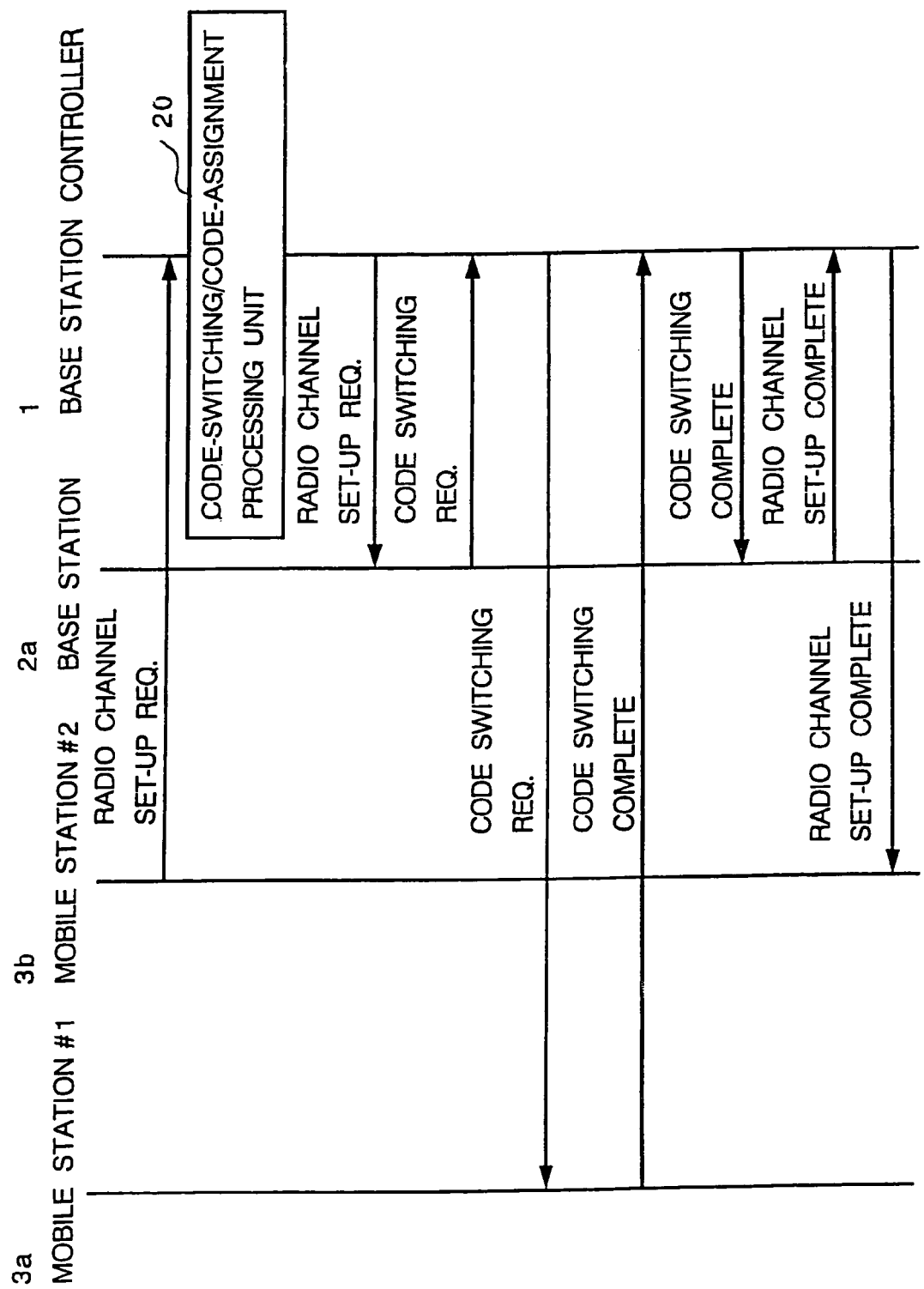
FIG. 5 illustrates sequence of another code assignment procedure according to the present invention.
Figure 6:
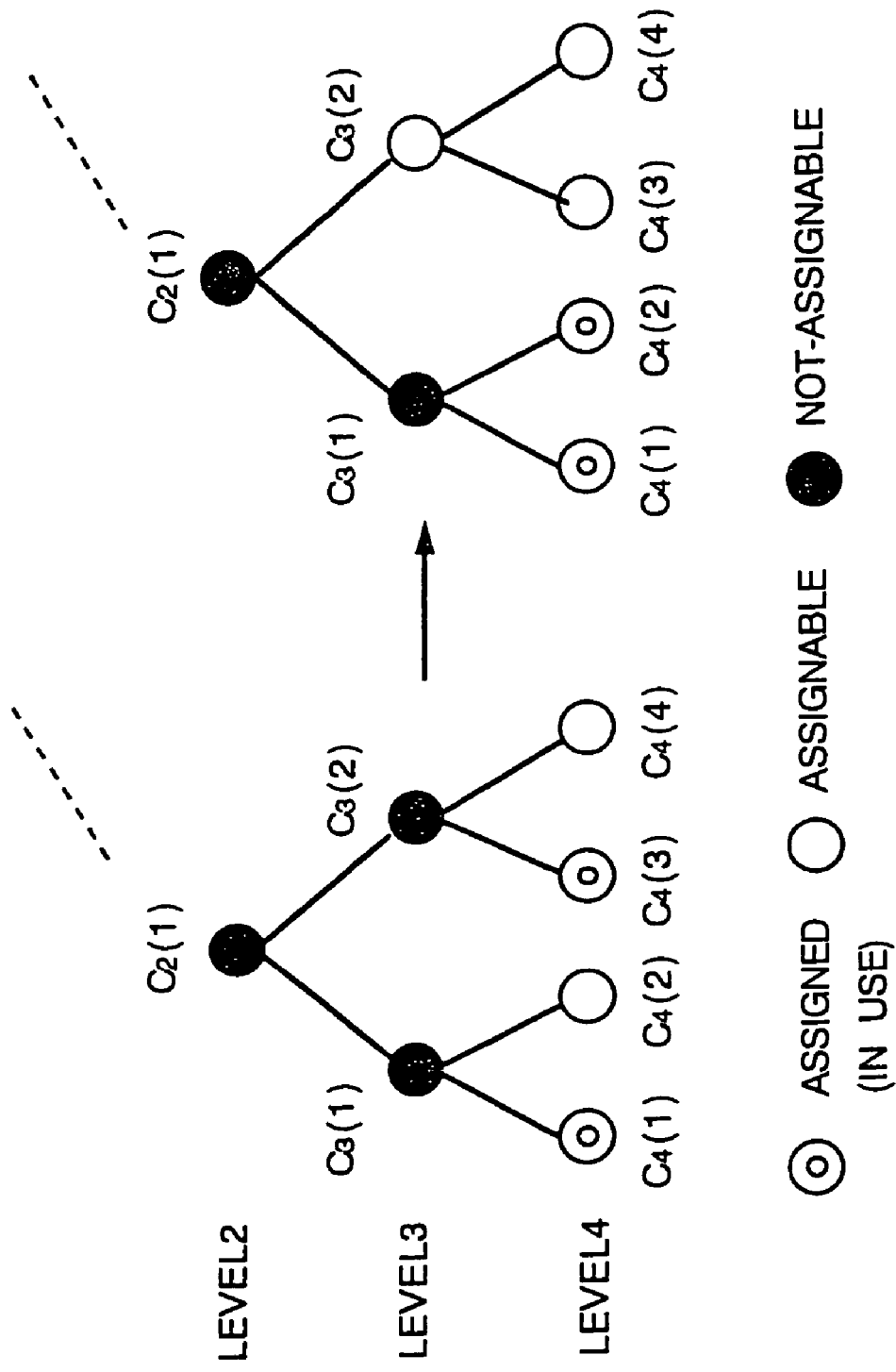
FIG. 6 shows a code structure used for a code switching procedure of FIG. 5.
Figure 7:
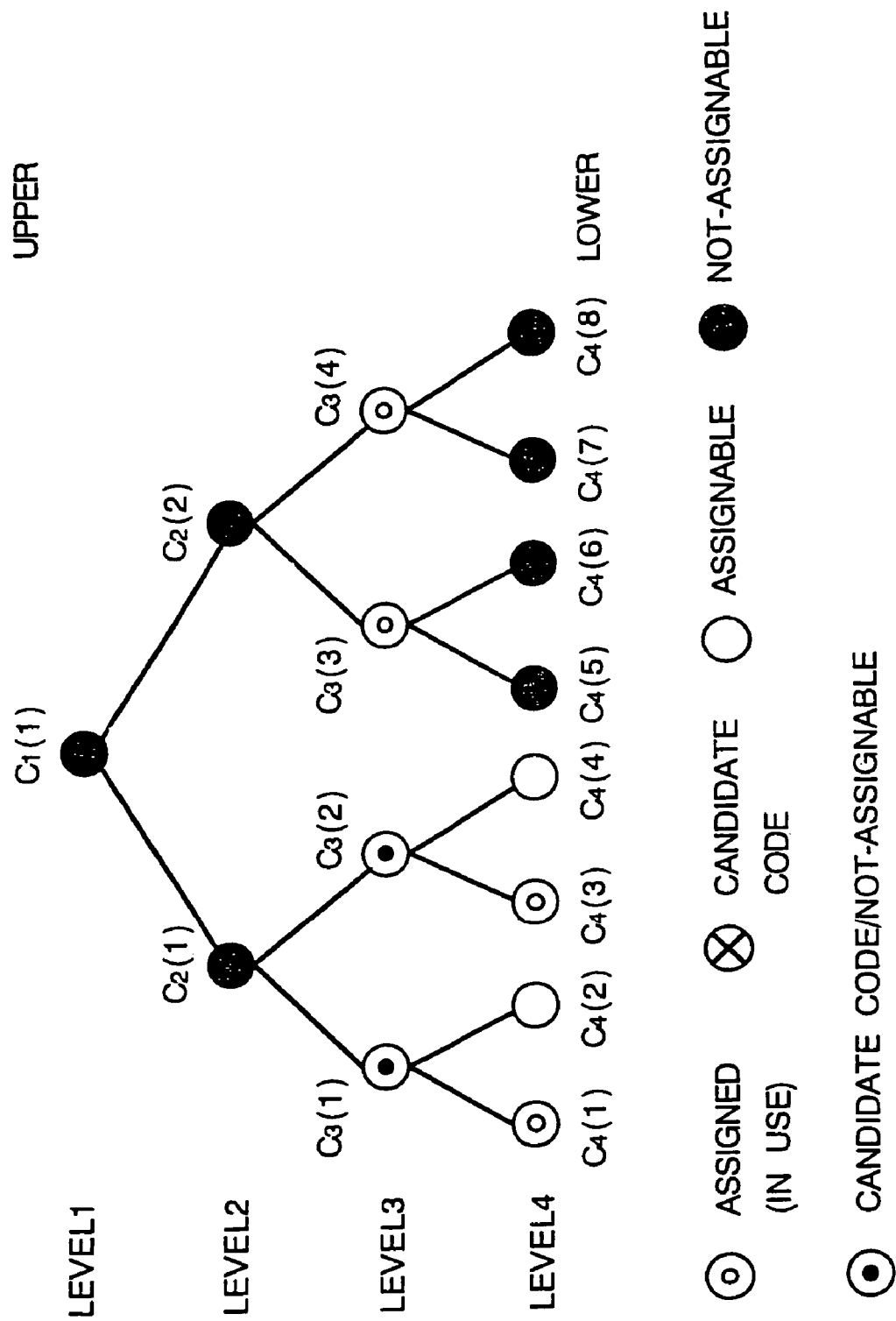
FIG. 7 shows a code structure used for selecting a code-switching candidate code.
Figure 8:
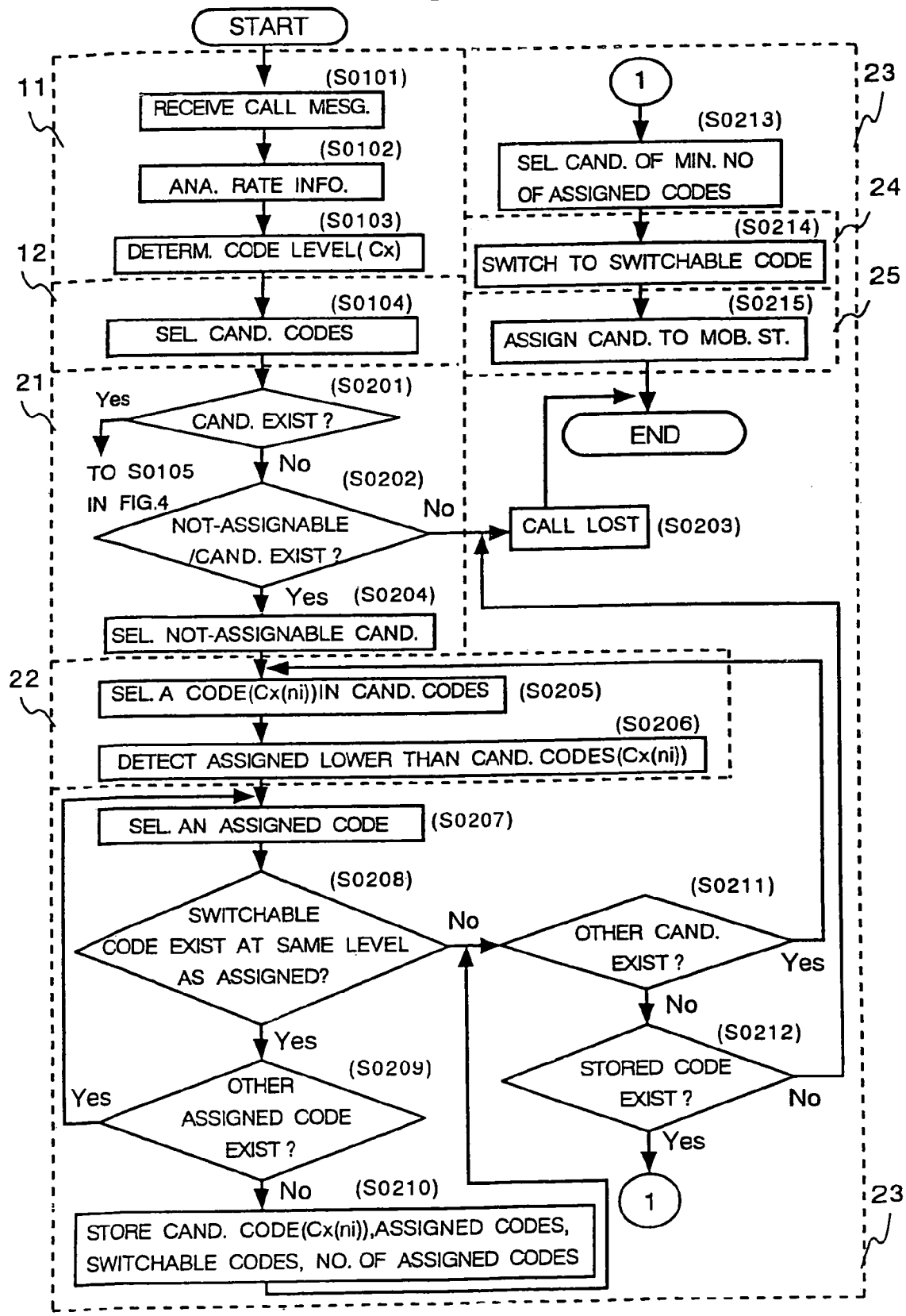
FIG. 8 is a flowchart showing a process of the code assignment procedure of FIG. 5.
Figure 14:
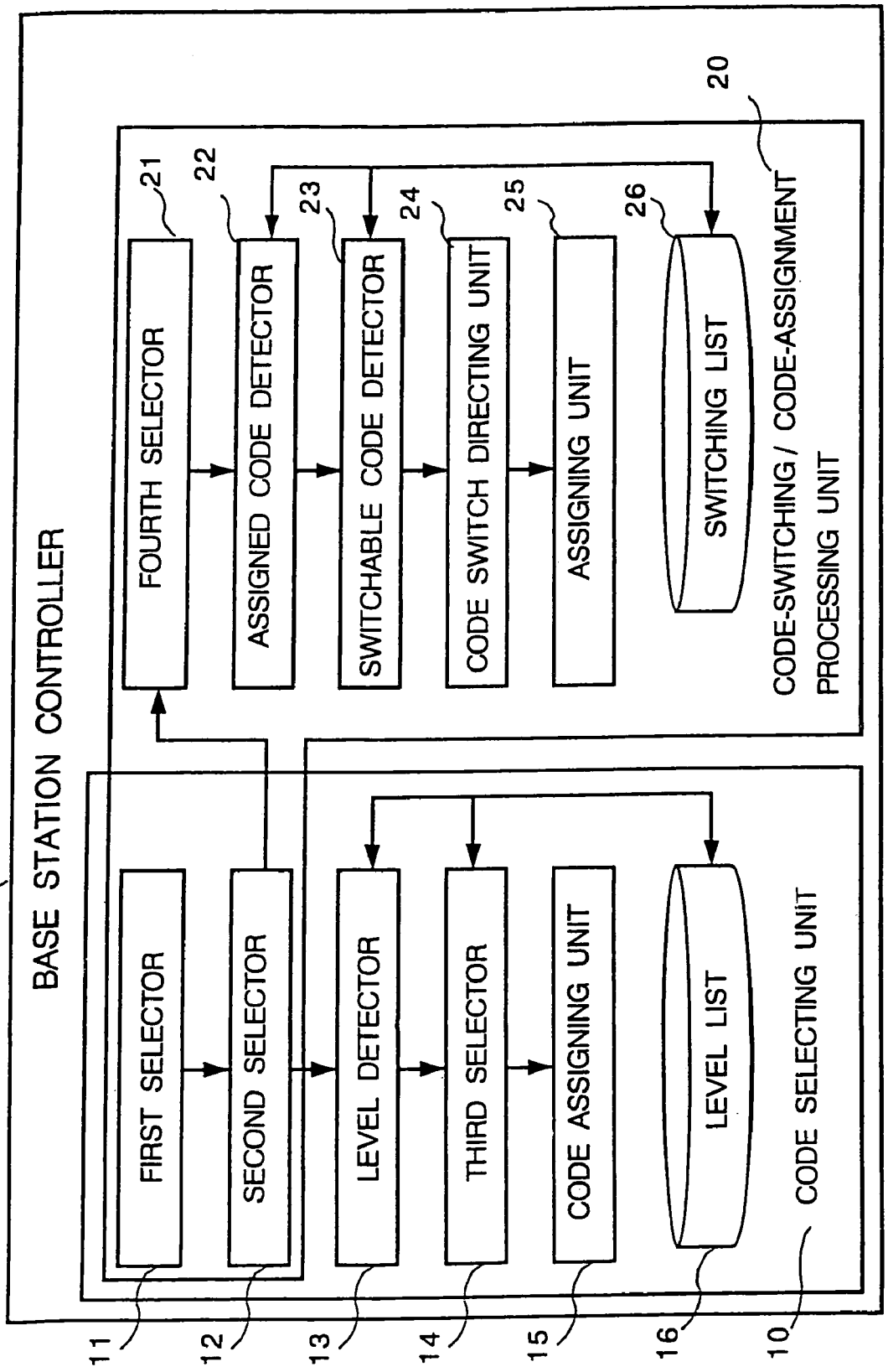
FIG. 14 shows configurations of a code selecting unit and a code-switching/code-assignment processing unit, in a base station controller according to the present invention.

FIG. 5 illustrates a code assignment sequence showing a code switching procedure, according to the present embodiment. FIG. 6 shows a code structure applied for the code switching procedure of FIG. 5. FIG. 7 shows a code structure used in selecting a candidate code for the code switching. FIG. 8 is a procedure flowchart for the code assignment sequence of FIG. 5. FIG. 14 shows a configuration of the base station controller according to the present embodiment. Referring to FIGS. 1, 5, 6, 7, 8 and 14, the code assignment according to the present embodiment will now be described.

The code switching is explained with reference to FIG. 6 showing a code assignment state change. The same code definition as FIG. 3 is used in FIG. 6. As stated in Embodiment 1, when a code has been already assigned to the mobile station 3, it is impossible to newly assign a code in upper level than the assigned code to another mobile station 3, because of the characteristic of spreading codes having tree structured orthogonal multi-spreading factor. In the left of FIG. 6, as $C_4(1)$ and $C_4(3)$ have been already assigned, it is impossible to assign $C_3(1)$ and $C_3(2)$ to another mobile station 3. Accordingly, if there is a call requesting a transmission rate corresponding to level 3 at this time, the call is to be lost. By switching the code from $C_4(3)$ to $C_4(2)$, however, $C_3(2)$ can be assigned, so that the call requesting the transmission rate corresponding to level 3 is accepted.

Referring to FIGS. 1 and 5, the code assignment procedure and the code switching procedure regarding the base station controller 1, the base station 2, and the mobile station 3 will now be explained. In FIG. 1, a mobile station #1 (3a) has been already used, and a mobile station #2 (3b) newly makes a call. As shown in FIG. 5, the mobile station #2 (3b) transmits a radio channel set-up request message indicating a transmission rate, to the base station controller 1 as stated in Embodiment 1.

When there is no assignable code as shown in the left of FIG. 6, it is necessary to perform code switching. Therefore, the mobile station #1 (3a) and a code are selected for the code switching, based on a method stated later. The radio channel set-up request message is transmitted to a base station 2a in order to assign the selected code to the mobile station #2 (3b).

The base station 2a judges whether the code appointed in the radio channel set-up request message can be used or not. In this case, as the code is being used by the mobile station #1 (3a), it is judged to be not usable. Then, a code switching request is transmitted to the base station controller 1. On receiving the code switching request from the base station 2a, the base station controller 1 transmits a code switching request message including information of code after switching to the mobile station #1 (3a). In the case of FIG. 6, the base station controller 1 defines $C_4(2)$ as the code after-switching in the code switching request message.

When the mobile station #1 (3a) receives the code switching request message, the mobile station #1 (3a) switches the original code to the target code (code after switching) ($C_4(2)$ in FIG. 6), and transmits a code switching complete message to the base station controller 1. The base station controller 1 judges, by receiving the code switching complete message, that the code has been switched in the mobile station #1 (3a). (The state has been changed from the left side to the right side in FIG. 6.) Then, the base station controller 1 transmits the code switching complete message to the base station 2a. After receiving the code switching complete message, the base station 2a transmits a radio channel set-up complete message to the base station controller 1. The base station controller 1 transmits the radio channel set-up complete message to the mobile station #2 (3b) in order to assign an assignable and requested-level code whose level is corresponding to the transmission rate requested by the mobile station #2 (3b) (that is, $C_3(2)$ in FIG. 6).

By performing the above procedures, a new radio channel requested by the mobile station 3 has been set up between the mobile station 3 and the base station 2. Now, the code switching procedure, for the mobile station #1 (3a) and the base station 2a, performed in the base station controller 1, and the code assigning procedure, for the mobile station #2 (3b) and the base station 2a, performed in the controller 1 are explained with reference to FIGS. 7, 8 and 14. Similar to FIG. 3, FIG. 7 shows a tree structure of codes having orthogonal multi-spreading factor sequence. The candidate code/not-assignable in the figure represents an unused code which is corresponding to a requested transmission rate and whose lower level code has been already assigned. FIG. 14 shows a configuration of a code-switching/code-assignment processing unit 20 in the base station controller 1. FIG. 8 is a flowchart showing a code switching and a code assigning process performed in the code-switching/code-assignment processing unit 20.

Similar to Embodiment 1, when the first selector 11 of the base station controller 1 receives the radio channel set-up request message from the mobile station #2 (3b) (S0101), the first selector 11 analyzes rate information in the message (S0102) and determines a code level in the tree structure corresponding to the rate information (S0103). In FIG. 7, for instance, the code level corresponding to the rate information is level 3. The second selector 12 of the base station controller 1 retrieves an assignable code of the determined level (S0104). When there is no assignable candidate code of the determined level (S0201), a fourth selector 21 selects a code which is not assignable and has not been itself assigned, as a candidate code (S0204). In FIG. 7, $C_3(1)$ and $C_3(2)$ are such codes. In the case of there being no code which is not assignable and has not been itself assigned yet (S0202: No), the original call becomes lost (S0203).

An assigned code detector 22 selects a code out of candidate codes ($C_3(2)$ in FIG. 7) (S0205), and detects an assigned code in lower level than the selected candidate code. (In FIG. 7 case, $C_4(3)$) (S0206). A switchable code detector 23 retrieves codes to see whether there is a switchable code at the same level as the above assigned code or not. (S0208). When there is a switchable code in the same level as the assigned code ($C_4(2)$ in FIG. 7), the candidate code ($C_3(2)$), the assigned code ($C_4(3)$) and the switchable code ($C_4(2)$) are stored in a switching list 26 as shown in FIG. 15 (S0210). This procedure is performed for every candidate code and every assigned code at the lower level than the candidate code. (S0207, S0209, S0211). In the case of there being candidate codes, the switchable code detector 23 selects one candidate code having the least number of assigned codes at its lower level, as an assignment target code (S0213).

In the above case, all the assigned codes have their switchable codes in the same level. In FIG. 7, there are two candidate codes: $C_3(1)$ and $C_3(2)$. As shown in FIG. 15, either of $C_3(1)$ and $C_3(2)$ has one assigned code ($C_4(1)$ is for $C_3(1)$, and $C_4(3s)$ is for $C_3(2)$), and both the candidate codes $C_3(1)$ and $C_3(2)$ have their switchable codes ($C_4(4)$ for $C_3(1)$ and $C_4(2)$ for $C_3(2)$) in the same level (level 4). Therefore, either of $C_3(1)$ and $C_3(2)$ can be selected as the assignment target code.

A code switch directing unit 24 switches the assigned code at the lower level of the selected assignment target code to the stored switchable code (S0214). In the case of selecting $C_3(2)$ as the assignment target code in FIG. 7, $C_4(3)$ is switched to $C_4(2)$. The code used by the mobile station #1 (3a) in FIG. 5 is corresponding to the assigned code. An assigning unit 25 assigns the selected assignment target code to the mobile station #2 (3b) (S0215).

The switching possibility is checked for all the assigned codes at the lower level of all the candidate codes, in the present embodiment. The checking process, however, can be completed at the first time of detecting a candidate code which has an assigned code to be switched at the lower level.

Even when a channel mismatch exists, according to the present embodiment, the call loss rate is reduced because a new high rate call can be achieved by switching a code being used in the mismatch channel. It is also acceptable to provide the code selecting unit 10 and the code-switching/code-assignment processing unit 20 of FIG. 14 in the base station 2 instead of the base station controller 1.

Embodiment 3.

Figure 9:
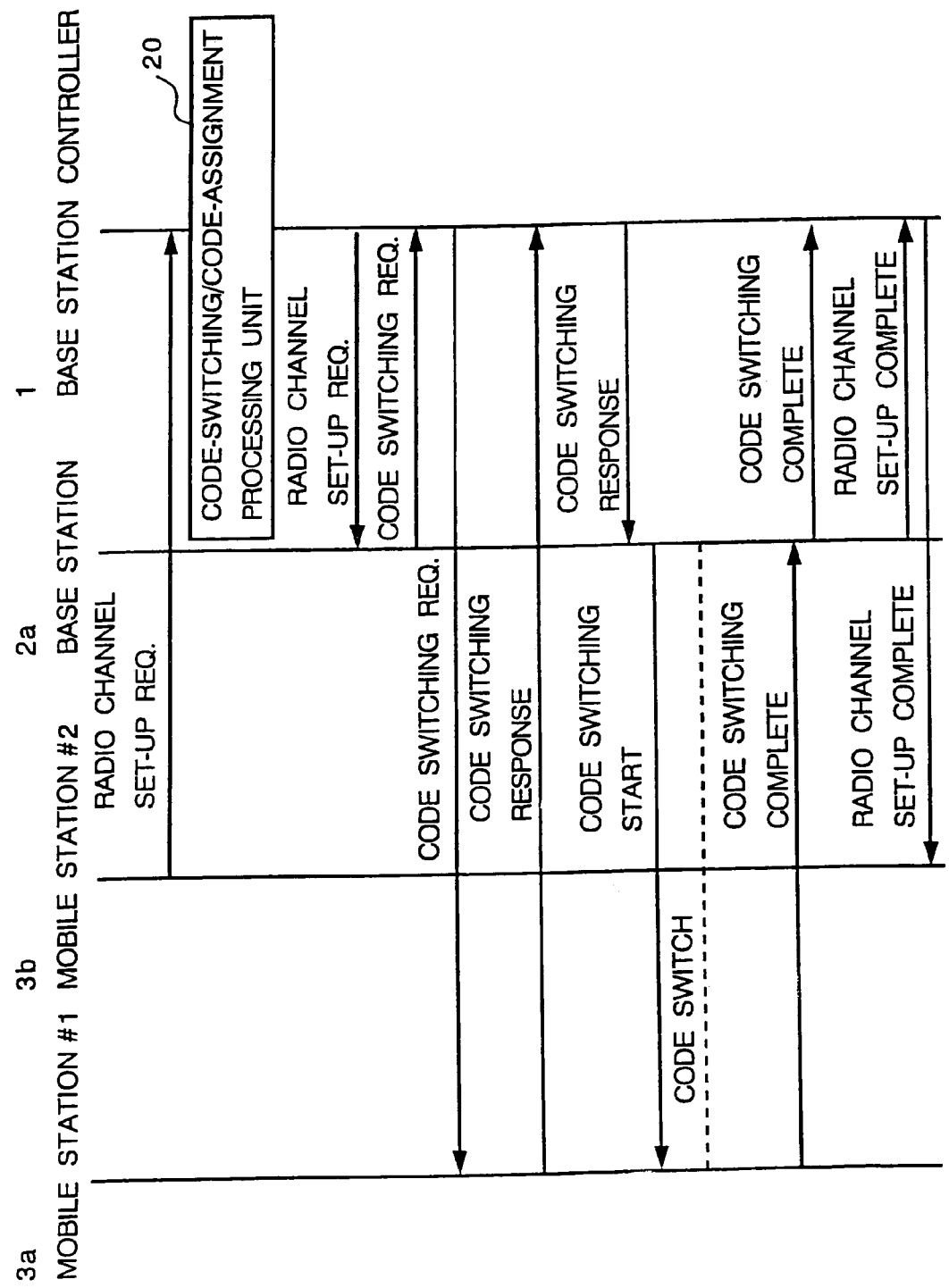
FIG. 9 illustrates sequence of another code assignment procedure according to the present invention.
Figure 16:
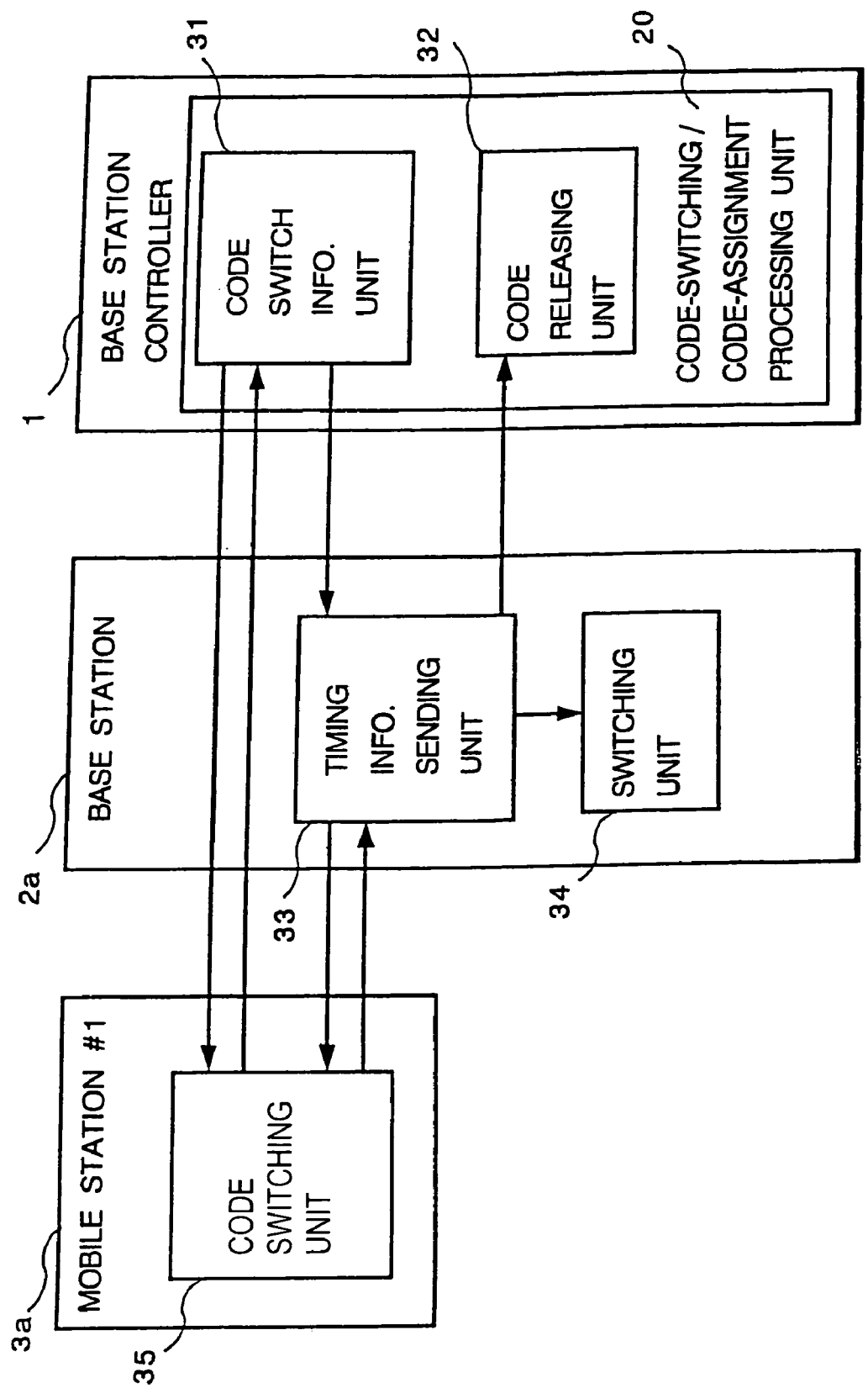
FIG. 16 shows a system structure according to the present invention.

FIG. 9 illustrates a code assignment sequence showing a code switching procedure, according to the present embodiment. FIG. 16 shows a system structure. Referring to FIGS. 1, 9, and 16, the code switching according to the present embodiment will be explained below.

As stated in Embodiment 2, it is sometimes necessary to switch codes during the communication. The code switching during the communication should be simultaneously performed at the base station 2 and the mobile station 3 in order not to stop the communication and so as to reduce interfering in other communication. The simultaneous switching is performed based on code switch timing information sent from a timing information sending unit 33 in the base station 2 to the mobile station 3. FIG. 9 illustrates procedures of sending the code switch timing information from the base station 2 to the mobile station 3.

The procedures, from transmitting a radio channel set-up request message by the mobile station #2 (3b) up to transmitting a code switching request message to the mobile station #1 (3a) by the base station controller 1, are the same as Embodiment 2 shown in FIG. 5. Therefore, procedures after the above will now be described in the present embodiment. A code switch informing unit 31 of the base station controller 1 transmits a code switching request message indicating a target code (code after switching) to the mobile station #1 (3a). On receiving the code switching request message, a code switching unit 35 of the mobile station #1 (3a) starts preparing for the code switching and transmits a code switching response message to the code switch informing unit 31 of the base station controller 1.

After receiving the code switching response message, the code switch informing unit 31 transmits the message indicating that the code of the mobile station #1 (3a) can be switched, to the base station 2a. Receiving the code switching response message, the timing information sending unit 33 of the base station 2a transmits a code switching start message to the mobile station #1 (3a). This code switching start message includes start timing information for the code switching. Then, if the radio channel is composed of frames, the code switching start message can be time information per frame.

It is acceptable to switch at the time of frame N (N is equal to 1 or an integer more than 1) after receiving the code switching start message. It is also acceptable for the timing information to use a code period of the spreading code. Thus, a switching unit 34 is synchronized with the code switching unit 35 in order to switch the code.

Receiving the code switching start message, the code switching unit 35 of the mobile station #1 (3a) switches the original code (code before switching) to the target code (code after switching) based on the time prescription specified in advance, using the timing information in the message. Then, the code switching unit 35 transmits a code switching complete message to the timing information sending unit 33 in the base station 2a using the target code. By receiving the code switching complete message, the timing information sending unit 33 judges that the code switching has been properly completed, and transmits the code switching complete message to the base station controller 1. By receiving the code switching complete message, a code releasing unit 32 of the base station controller 1 judges that the code used by the mobile station #1 (3a) has been released, and transmits a radio channel set-up complete message for assigning the code used by the mobile station #1 (3a) to the mobile station #2 (3b).

As the code switch timing between the mobile station 3 and the base station 2 can be set up according to the present embodiment, it is not necessary for the base station 2 to simultaneously perform reception and transmission using both the original code and the target code. Consequently, interfering with other communications is reduced.

Embodiment 4.

Figure 10:
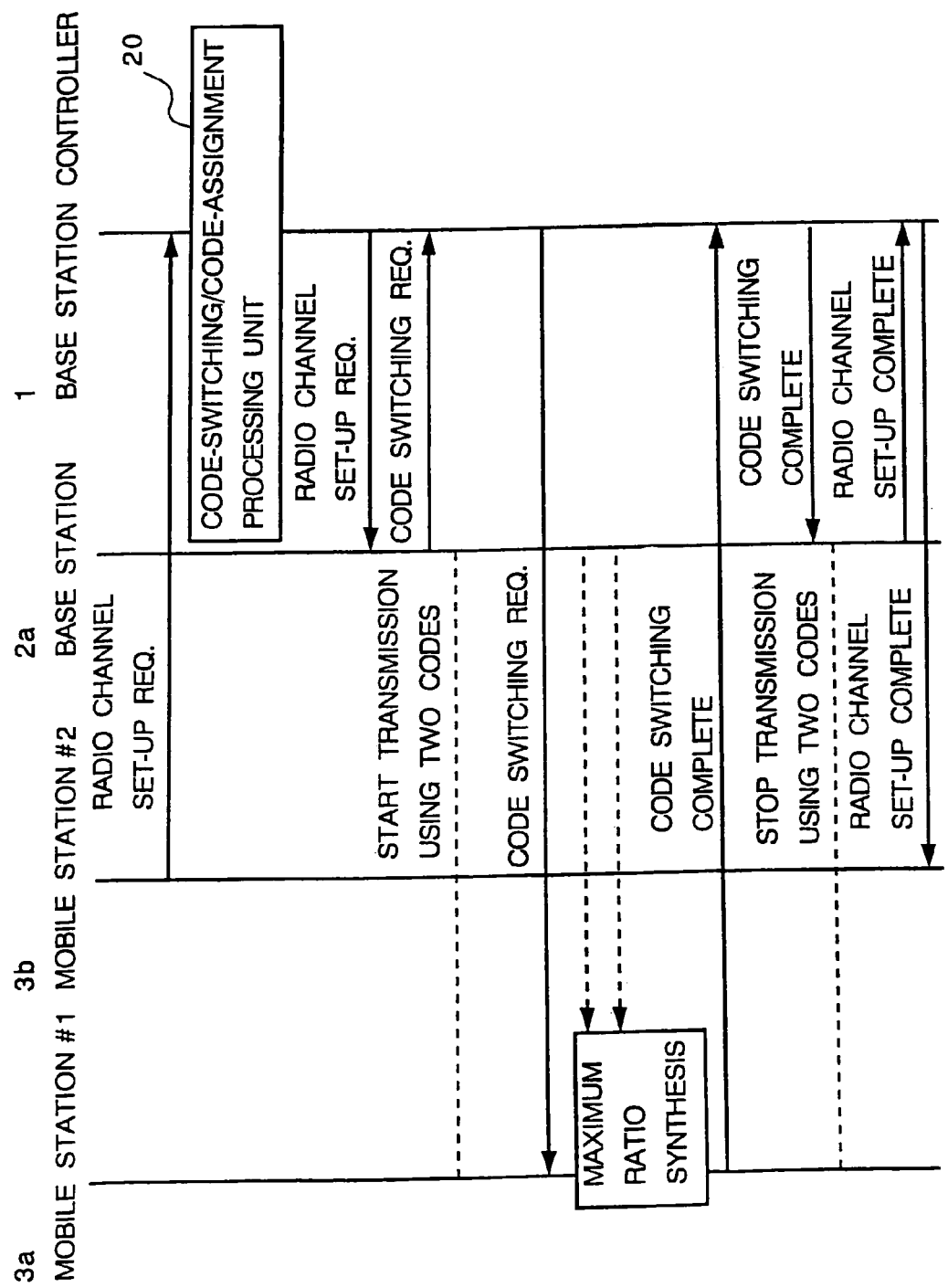
FIG. 10 illustrates sequence of another code switching procedure according to the present invention.
Figure 11:
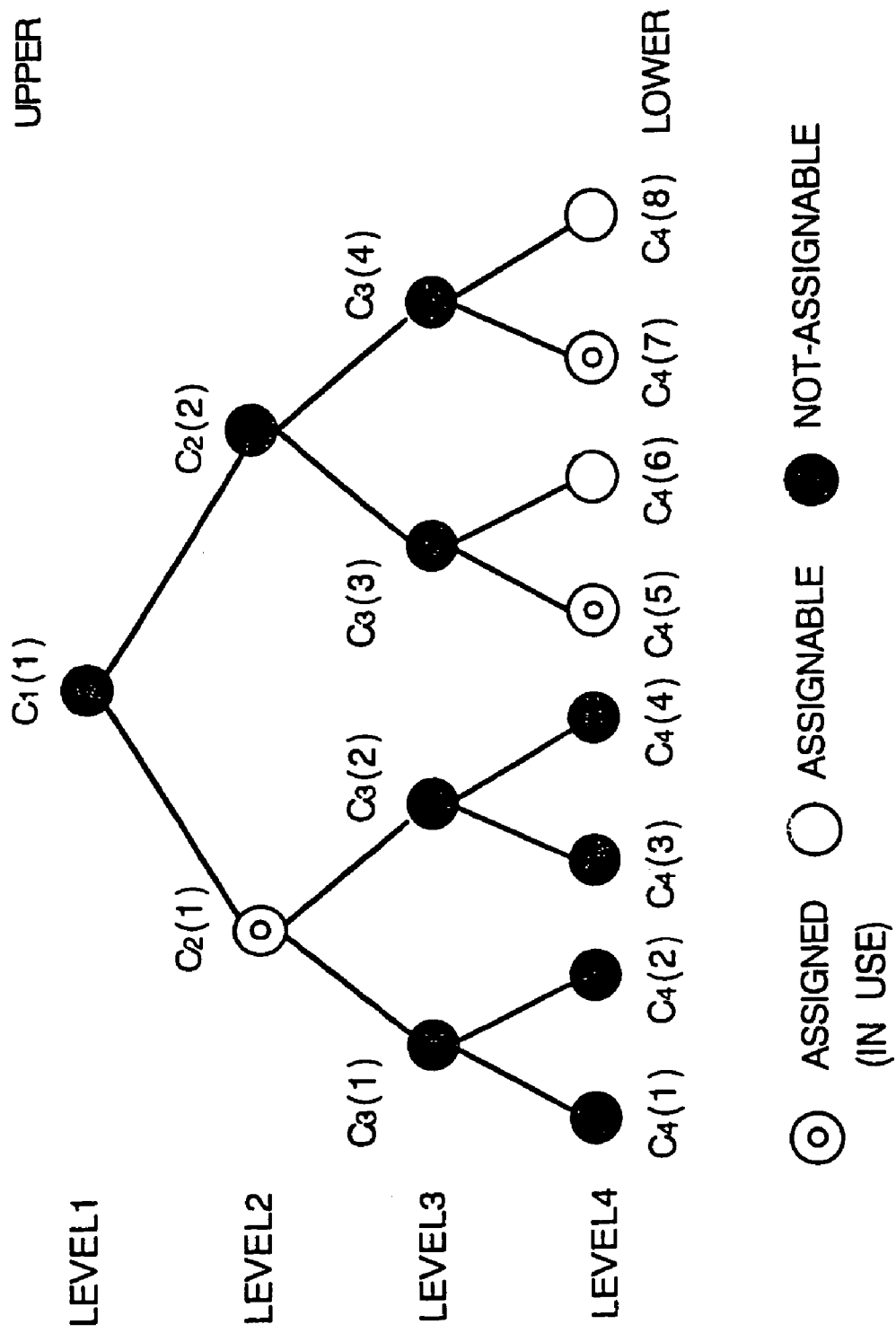
FIG. 11 shows a tree structure of codes having tree structured orthogonal multi-spreading factor sequence, used in a conventional art.

FIG. 10 illustrates a code assignment sequence showing a code switching procedure using the maximum ratio combination of the mobile station 3, according to the present embodiment. FIG. 17 shows a system structure. Referring to FIGS. 10 and 17, the code switching according to the present embodiment will now be described.

The procedures, from transmitting the radio channel set-up request message by the mobile station #2 (3b) up to transmitting the code switching request message by the base station 2a to the base station controller 1, are the same as Embodiment 2 shown in FIG. 5. Therefore, procedures after the above will now be described in the present embodiment.

As shown in FIG. 10, after the base station 2a sends the code switching request message to the base station controller 1, a transmitting unit 43 of the base station 2a performs reception and transmission with a regenerating unit 44 of the mobile station #1 (3a) using both the original code (code before switching) and the target code (code after switching). When the base station controller 1 receives the code switching request message from the base station 2a, a first code switching unit 41 of the base station controller 1 transmits the message to the mobile station #1 (3a), and instructs the regenerating unit 44 of the mobile station #1 (3a) to switch the code. On receiving the code switching request message, the regenerating unit 44 begins to receive signals based on the maximum ratio combination, using both the original code (code just in use) and the target code appointed by the code switching request message.

Regarding the transmission, either of the following methods is acceptable. One is to independently switch the code by using a second code switching unit 45 of the mobile station #1 (3a). The other is to transmit signals from the mobile station #1 (3a) with using both the original code in use and the target code. In this case of transmitting with using both the codes, it is also acceptable to perform the maximum ratio combination at the base station 2.

When the second code switching unit 45 of the mobile station #1 (3a), in which the reception has been performed by the regenerating unit 44 based on the maximum ratio combination, begins to independently receive signals using the target code only, a switching complete informing unit 46 of the mobile station #1 (3a) transmits a code switching complete message to a code releasing unit 42 of the base station controller 1 with using the target code. Then, the code releasing unit 42 judges that the code having been used in the mobile station #1 (3a) until this time is released and the code switching is completed. The code releasing unit 42 transmits the code switching complete message to the base station 2a. On receiving the code switching complete message from the base station controller 1, the base station 2a stops transmitting signals to the mobile station #1 (3a) using the original code, releases the original code, prepares for the reception and the transmission with the mobile station #2 (3b) using the original code, and transmits a radio channel set-up complete message to the base station controller 1.

After receiving the radio channel set-up complete message from the base station 2a, the base station controller 1 transmits the message indicating to set up the original code, having been used in the mobile station #1 (3a), for the mobile station #2 (3b). As stated above, the code switching process using the maximum ratio combination has been performed.

According to the present embodiment procedures, the code switch timing can be achieved based on own timing of the mobile station 3 without deteriorating the channel quality. Namely, the time needed for code switching can be reduced.

In addition, it is also acceptable that the code assignment is controlled by the base station 2 instead of the base station controller 1.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A radio communication method of a base station used for a radio communication system employing CDMA (Code Division Multiple Access) for radio access with a plurality of mobile stations, a plurality of base stations, and a base station controlling apparatus, said base station being one of the plurality of base stations, said base station controlling apparatus controlling the plurality of base stations and the plurality of mobile stations, the radio communication method comprising:

transmitting code information by message from the base station controlling apparatus to one of the plurality of mobile stations, said code information for switching from a first code being used to a second code, transmitting timing information by message to the one of the plurality of mobile stations, the timing information indicating a timing of switching from the first code to the second code, switching at the base station a spreading code from the first code to the second code in synchronization with a switching of the first code to the second code at the one of the plurality of mobile stations, said one of the plurality of mobile stations switching from the first code to the second code based on the transmitted timing information, and receiving a code switching complete message from the one of the plurality of mobile stations, said code switching complete message indicating a completion of switching from the first code to the second code at the one of the plurality of mobile stations.

2. A base station used for a radio communication system employing CDMA (Code Division Multiple Access) for radio access with a plurality of mobile stations, a plurality of base stations, and a base station controlling apparatus, said base station being one of the plurality of base stations, said base station controlling apparatus controlling the plurality of base stations and the plurality of mobile stations, the base station comprising:

a code informing unit configured to transmit code information by message from the base station controlling apparatus to one of the plurality of mobile stations, said code information for switching from a first code being used to a second code;

a timing information sending unit configured to transmit timing information by message to the one of the plurality of mobile stations, the timing information indicating a timing of switching from the first code to the second code; and a switching unit configured to switch a transmission code at the base station from the first code to the second code in synchronization with a switching of the first code to the second code at the one of the plurality of mobile stations, said one of the plurality of mobile stations switching from the first code to the second code based on the transmitted timing information, the timing information sending unit further configured to receive a code switching complete message from the one of the plurality of mobile stations, said code switching complete message indicating a completion of switching from the first code to the second code at the one of the plurality of mobile stations.

3. A radio communication method of a base station used for a radio communication system employing CDMA (Code Division Multiple Access) for radio access with a plurality of mobile stations and a base station controlling apparatus, said base station being one of a plurality of base stations, said base station controlling apparatus controlling the plurality of base stations and the plurality of mobile stations, the radio communication method comprising:

transmitting code information by message from the base station controlling apparatus to one of the plurality of mobile stations, said code information for switching from a first code being used to a second code;

transmitting timing information by message to the one of the plurality of mobile stations, the timing information indicating a timing of switching from the first code to the second code;

switching at the base station a spreading code from the first code to the second code in accordance with said timing information; and receiving a code switching complete message from the one of the plurality of mobile stations, said code switching complete message indicating a completion of switching from the first code to the second code at the one of the plurality of mobile stations.

4. A base station used for a radio communication system employing CDMA (Code Division Multiple Access) for radio access with a plurality of mobile stations and a base station controlling apparatus, said base station being one of a plurality of base stations, said base station controlling apparatus controlling the plurality of base stations and the plurality of mobile stations, the base station comprising:

a code informing unit configured to transmit code information by message from the base station controlling apparatus to one of the plurality of mobile stations, said code information for switching from a first code being used to a second code; and a timing information sending unit configured to transmit timing information by message to the one of the plurality of mobile stations, the timing information indicating a timing of switching from the first code to the second code;

a switching unit configured to switch a transmission code at the base station from the first code to the second code in accordance with said timing information, wherein the timing information sending unit is further configured to receive a code switching complete message from the one of the plurality of mobile stations, said code switching complete message indicating a completion of switching from the first code to the second code at the one of the plurality of mobile stations.

* * * * *